United States Patent
Schwarzkopf

(10) Patent No.: US 8,511,077 B2
(45) Date of Patent: Aug. 20, 2013

(54) SYSTEM FOR CONTROLLING THE TEMPERATURE OF A FLUID ADDITIVE IN A MOTOR VEHICLE

(75) Inventor: Otfried Schwarzkopf, Kürten (DE)

(73) Assignee: VOSS Automotive GmbH, Wipperfürth (DE)

( * ) Notice: Subject to any disclaimer, the term of this patent is extended or adjusted under 35 U.S.C. 154(b) by 670 days.

(21) Appl. No.: 12/391,389

(22) Filed: Feb. 24, 2009

(65) Prior Publication Data

US 2009/0211236 A1 Aug. 27, 2009

(30) Foreign Application Priority Data

Feb. 26, 2008 (DE) .................... 20 2008 002 696 U

(51) Int. Cl.
| F01N 3/00 | (2006.01) |
| F01N 3/10 | (2006.01) |
| F01N 3/02 | (2006.01) |
| F01N 5/02 | (2006.01) |
| B60H 3/00 | (2006.01) |
| B61D 27/00 | (2006.01) |

(52) U.S. Cl.
USPC .................... 60/320; 60/295; 60/301; 165/42

(58) Field of Classification Search
USPC ............. 60/286, 295, 301, 302, 320; 165/41, 165/42; 62/159, 160, 324.1, 324.6
See application file for complete search history.

(56) References Cited

U.S. PATENT DOCUMENTS

| 4,299,098 A * | 11/1981 | Derosier ...................... 62/238.6 |
| 7,168,400 B1 * | 1/2007 | Toscano et al. ............ 123/41.19 |
| 2001/0001982 A1 * | 5/2001 | Khelifa et al. ................ 165/202 |
| 2007/0193291 A1 * | 8/2007 | Reddin et al. .................... 62/239 |
| 2007/0214789 A1 * | 9/2007 | Stiermann ........................ 60/616 |
| 2008/0092531 A1 * | 4/2008 | Suzuki et al. ................... 60/301 |
| 2008/0141688 A1 * | 6/2008 | Stanke et al. .................... 62/149 |
| 2009/0038296 A1 * | 2/2009 | Fukuda et al. .................. 60/295 |

FOREIGN PATENT DOCUMENTS

| DE | 19818649 A1 | 10/1999 |
| DE | 102005059581 A1 * | 6/2007 |
| EP | 1698769 A2 | 9/2006 |
| GB | 2471506 A * | 1/2011 |
| WO | WO 2007122846 A1 * | 11/2007 |

OTHER PUBLICATIONS

Martin et al., Babelfish machine translation of DE 10 2005 059 581 A1, Jun. 21, 2007.*
Martin et al., English abstract of DE 10 2005 059 581 A1, Jun. 21, 2007.*
Dictionary.com Definition of "Refrigerant."*

* cited by examiner

Primary Examiner — Kenneth Bomberg
Assistant Examiner — Audrey K Bradley
(74) Attorney, Agent, or Firm — Brinks Hofer Gilson & Lione

(57) ABSTRACT

The present invention relates to a system for controlling the temperature of a fluid additive for an exhaust system of an internal combustion engine. The system has means for exchanging heat between the additive and a refrigerant circuit of a refrigerant system. The fluid additive is preferably a $NO_x$-reducing additive, in particular a urea-water solution, for an SCR catalytic converter system of a motor vehicle. Here, a direct or indirect exchange of heat may be provided between the refrigerant circuit of the refrigerant system, specifically in particular of a vehicle air conditioning system, and the additive.

15 Claims, 5 Drawing Sheets

SYSTEM FOR CONTROLLING THE TEMPERATURE OF A FLUID ADDITIVE IN A MOTOR VEHICLE

CROSS REFERENCE TO RELATED APPLICATIONS

This application claims the benefit of priority to German Utility Model Application No. DE 20 2008 002 696.2, filed Feb. 26, 2008, the content of which is hereby incorporated by reference.

BACKGROUND OF THE INVENTION

1. Field of the Invention

The present invention relates to a system for controlling the temperature of a fluid additive for an exhaust system of an internal combustion engine, in particular of a urea-water solution for an SCR catalytic converter system in a motor vehicle.

2. Background

In motor vehicle technology, in diesel engines in particular, use is made in part of so-called SCR (selective catalytic reduction) catalytic converters, with an aqueous, for example 32.5% urea water solution being used as a $NO_x$-reducing additive. Here, it is a known problem that a urea-water solution, on account of a relatively high freezing point (approximately −11° C.), tends to freeze even at ambient temperatures which are not uncommon depending on weather conditions and geographical location.

EP 1 698 769 A2 therefore describes a method and a device for supplying an additive for exhaust-gas purification in a vehicle, with the additive being heated to a temperature above its freezing point for the reasons stated above. This may take place either by means of the heat of the engine coolant or by means of the heat loss from a so-called retarder. However, both of these heat sources are available only after the vehicle has been operating for a certain period of time, such that no heat or an insufficient level of heat is available during a cold start phase.

DE 198 18 649 A1 describes a vehicle air conditioning system in a particular use with a heating mode ("heat pump mode") for heating the engine coolant, and therefore in the case of a cold start, for heating up the engine and the passenger compartment more quickly.

The object on which the present invention is based is that of creating a system of the generic type described in the introduction, by means of which the temperature of a liquid additive can be controlled particularly effectively, even during an engine cold start phase.

According to the invention, this is achieved by means for exchanging heat between the additive of the exhaust system and a refrigerant circuit of a practically arbitrary "refrigeration system", such as in particular an air conditioning system. It is therefore possible in particular for an SCR reducing additive to be directly or else indirectly heated, or cooled by means of a "switchover mode" if required. The exchange of heat can take place very quickly and with a very high level of efficiency even after a start-up of the engine and of the refrigeration system. A refrigeration system may possibly also include a vehicle cold room system in the mode as a "heat pump".

Further advantageous design features and special embodiments of the invention are described in the dependent claims and in the following description.

BRIEF DESCRIPTION OF THE DRAWINGS

The invention will now be explained in more detail by way of example on the basis of the drawing, in which.

DETAILED DESCRIPTION OF THE INVENTION

It is pointed out by way of introduction that the expression "heat exchanger" is to be understood very generally in connection with the present invention, that is to say said expression need not necessarily mean a through-flow exchanger with two flow paths for two media. The expression "heat exchanger" rather denotes any device or any element which is suitable for bringing about an exchange of heat from a first medium (in particular refrigerant) to a second medium (liquid additive, in particular SCR reducing additive) or vice versa. Here, it is also possible for at least one of the media not to be, or to at least not constantly be, present in the form of a moving flow, or to be present in the form of an only slightly moving flow. This applies in particular to the SCR reducing additive because the latter, on account of the very low consumption thereof, is contained virtually without movement in the line and supply system.

Figure 1:
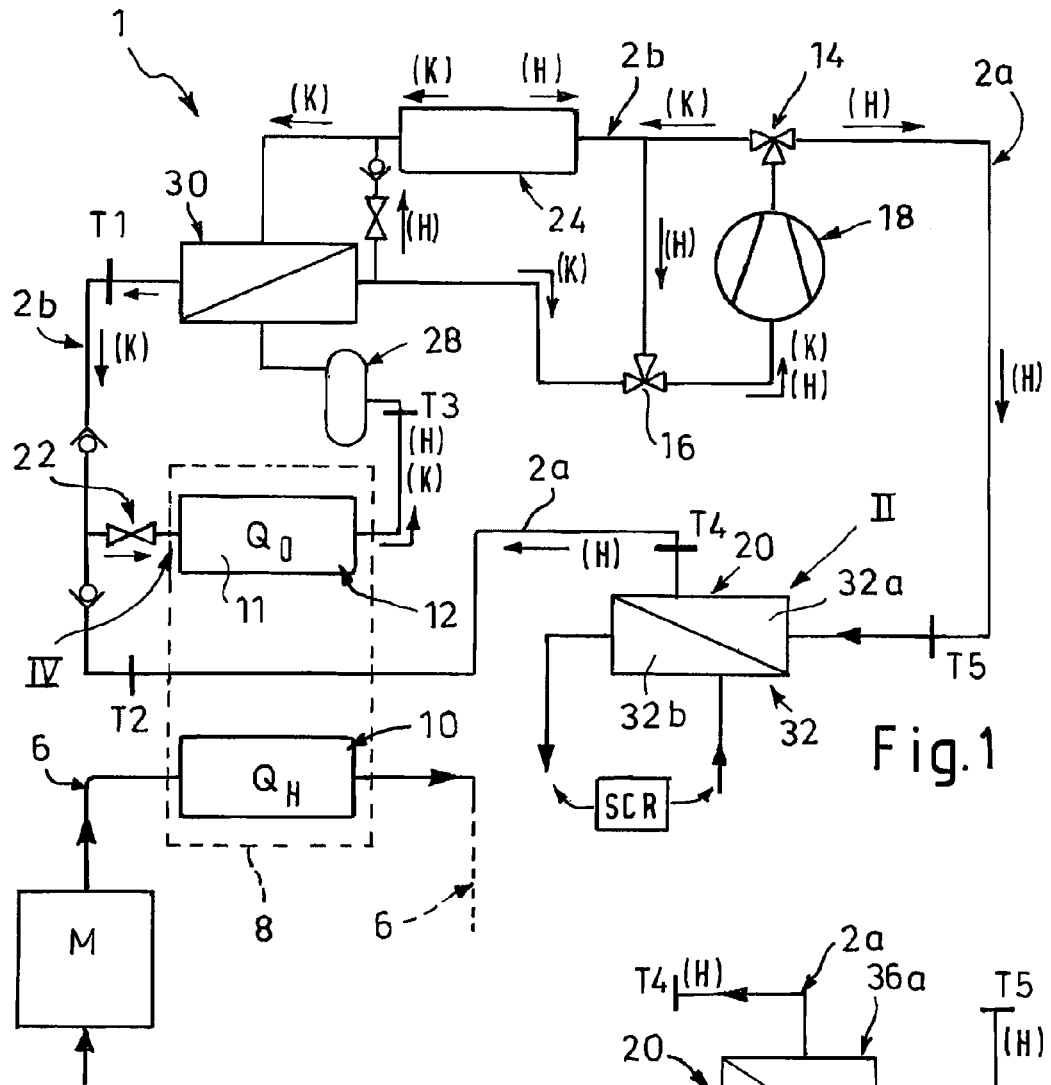
FIG. 1 shows a schematic block circuit diagram of a refrigeration system designed according to the invention, for example in a design as a vehicle air conditioning system.

FIG. 1 shows, by way of example, an air conditioning system 1 in a design according to the invention, with means for exchanging heat between a refrigerant circuit 2a or 2b (FIG. 4) and a basically arbitrary liquid additive, such as for example a reducing additive of an SCR catalytic converter, with the catalytic converter system not being illustrated in detail in FIG. 1, but rather being indicated only by the additive with the reference symbol "SCR".

Figure 4:
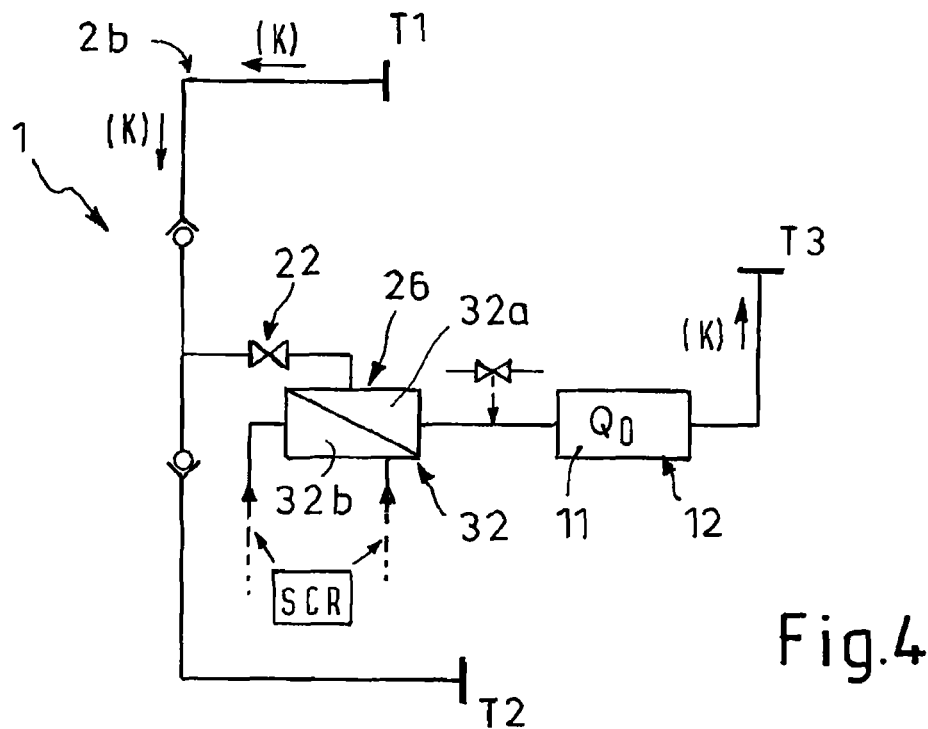
FIG. 4 shows a further detail in the region IV as per FIG. 1 with an optional (additional) additive heat exchanger provided for cooling.

In the embodiment according to FIG. 1, means are provided for a direct exchange of heat between the refrigerant circuit 2a or 2b of the air conditioning system 1 and the additive SCR, with heating of the additive SCR being possible according to FIG. 1, and/or optionally cooling of the additive SCR being possible according to FIG. 4. For this purpose, the circuit part according to FIG. 4 would be exchanged, via parting points T1, T2 and T3, for the corresponding part in FIG. 1.

Figure 2:
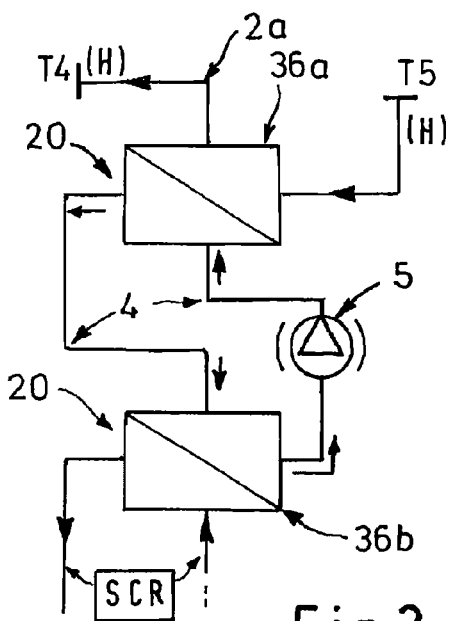
FIG. 2 shows a detail in the region 11 as per FIG. 1 in a design variant in the region of an additive heat exchanger.

An embodiment variant according to FIG. 2 involves an indirect exchange of heat via an intermediate circuit 4 of a heat carrier medium, wherein in the example according to FIG. 2, the intermediate circuit 4 is an additional, self-contained circuit of an arbitrary heat carrier medium. Here, it is possible for a pump 5 to be provided within said closed intermediate circuit 4. The part according to FIG. 2 would be connected to the rest of the circuit via parting points T4 and T5 in FIG. 1.

As an alternative to the embodiment according to FIG. 2, it is also possible for the intermediate circuit 4 to be part of a coolant circuit 6 of an engine M, as is shown partially in FIG. 1. Said embodiment has the advantage that the engine coolant is also heated in addition to the additive SCR, which results in a faster warm-up of the engine M, and also of the vehicle interior by means of the conventional heating system, in the event of a cold start.

As is also illustrated in FIG. 1, firstly a first heat exchanger 10 (heating element), which is traversed by the engine coolant, and secondly a second heat exchanger 12, which is formed in particular by an evaporator 11 of the air conditioning system 1, are arranged in an air-conducting part 8 (indicated merely by dashed lines) of the vehicle, the so-called HVAC (heating, ventilating and air conditioning) unit.

The air conditioning system 1 is now designed according to the invention such that it may be operated selectively in a cooling mode or in a heating mode (heat pump mode). For this purpose, according to FIG. 1, switching valves 14 and 16 are provided in such a way that, for the heating mode (arrows H), the refrigerant circuit 2a runs via a compressor 18, an additive heat exchanger 20, an expansion valve 22, the evaporator 11 and a condenser 24, while for the cooling mode (arrows K), the "normal" refrigerant circuit 2b runs via the compressor 18, the condenser 24, the expansion valve 22 and the evaporator 11. Here, in order to cool the additive SCR (for example in hot surroundings within the vehicle, such as at the exhaust section), it is also optionally possible as per FIG. 4 for an additive heat exchanger 26 to be provided between the expansion valve 22 and the evaporator 11. In the heating mode (H), the ambient air preferably serves as a heat source (heat absorbed in particular via the condenser 24), though at least one other heat source is also possible.

It is also possible in a preferred embodiment for an accumulator 28 and/or an auxiliary heat exchanger 30 to be arranged between the evaporator 11 and the condenser 24. The auxiliary heat exchanger 30 serves for an "internal exchange of heat" of the refrigerant.

Figure 5:
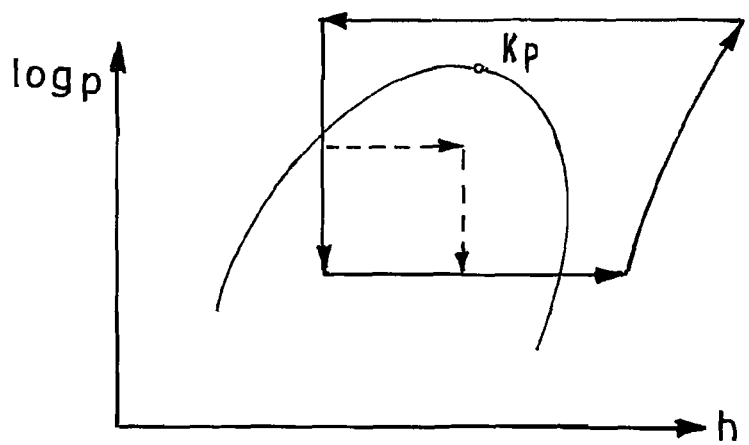
FIG. 5 shows a possible pressure-enthalpy diagram of the system according to the invention.

At this juncture, it should also be noted that—depending on the type of refrigerant used—the condenser 24 may also be replaced with a gas cooler (in the case of a supercritical cycle, for example cold steam process), with the gas cooler—similarly to the condenser 24—also serving to absorb heat in particular from the ambient air. Furthermore, it is also possible for multi-stage expansion to be provided in the region of the expansion valve, as shown by dashed lines by way of example in the diagram according to FIG. 5.

There are various possibilities for the design of the heat exchanger(s) used. According to FIGS. 1 and 4, it is possible for the or each additive heat exchanger 20, 26 to be designed as a through-flow exchanger 32 with a first through-flow passage 32a for the refrigerant and a second through-flow passage 32b for the additive SCR. According to FIG. 3, it is also possible for the/each additive heat exchanger to be designed as a tank exchanger 34 with a tank 34a for the additive SCR and a through-flow passage 34b, designed for example as a tube coil, for the refrigerant.

Figure 3:
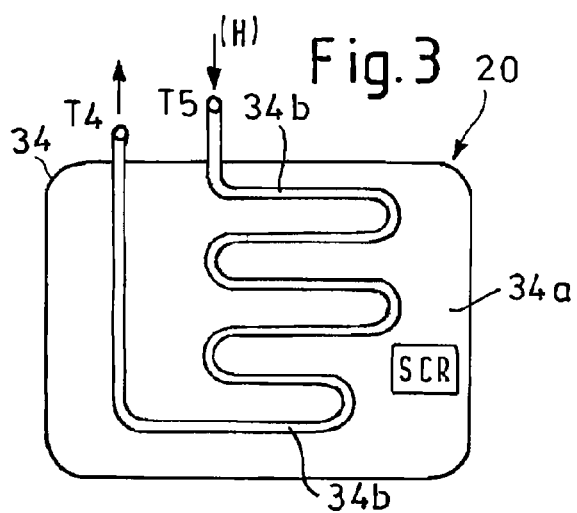
FIG. 3 shows a highly schematic illustration of a tank heat exchanger.

According to FIG. 2, the additive heat exchanger 20 for the indirect exchange of heat via the intermediate circuit 4 is composed of two partial heat exchangers 36a and 36b, specifically a first heat exchanger 36a between the refrigerant circuit 2a and the intermediate circuit 4, and a second heat exchanger 36b between the intermediate circuit 4 and the additive SCR. As illustrated, both heat exchangers 36a and 36b may be designed as through-flow exchangers, similarly to FIGS. 1 and 4. Alternatively, a design as a tank exchanger according to FIG. 3 is of course also possible. This applies primarily to the second heat exchanger 36b.

For the compressor 18, it is advantageously possible to use a location-independent design with a separate, in particular electromotive drive. In contrast to a so-called "open compressor" which is driven by the motor vehicle engine for example via a belt drive and which must therefore be arranged in the vicinity of the engine, the electrically driven compressor may be arranged in a location-independent manner, and therefore for example also in the vicinity of the tank.

FIGS. 6 to 10 show different design variants of the system according to the invention in a simplified block illustration, in which:

A—denotes the refrigerant circuit (2a, 2b) of the air conditioning system 1 (A/C-circuit)

B—denotes the coolant circuit (6) of the vehicle engine M

C—denotes the intermediate circuit (4) of a heat or cold carrier

D—denotes the exhaust-gas catalytic converter system, additive (urea solution)

For the circuit A, it is possible as refrigerant to use—at least for a certain period of time while still permitted—R 134 a or else for example R 152 a in a pressure range from 3 to 15 bar. In the future, use will however preferably be made of R 744 ($CO_2$) at high pressure (40 to 150 bar). Said refrigerant is particularly suitable both from an energetic perspective and also with regard to environmental compatibility.

The circuit B is conventionally operated as coolant with water, in particular with an anti-freeze additive.

The circuit C may operate with a permanently liquid medium (pump) or else with a phase change ("thermal pump").

FIGS. 6 to 10 show the heat flow directions for the heating mode ($_H$) and for an optional cooling mode ($_K$).

Figures 6, 7:
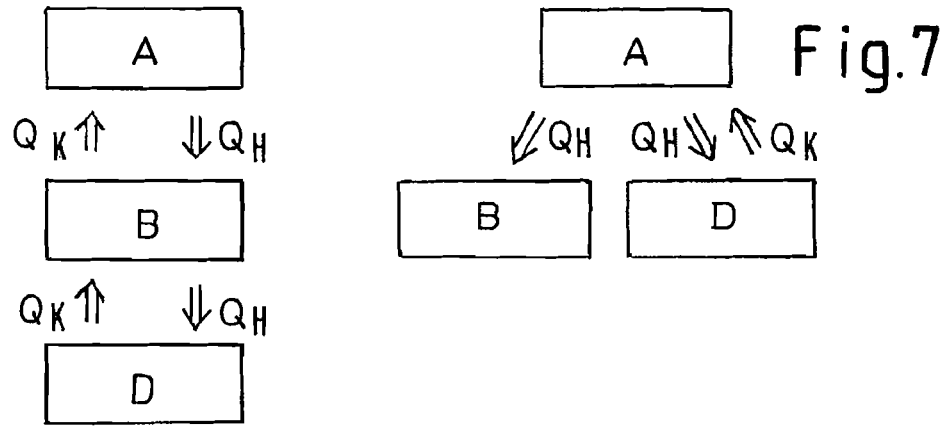
FIG. 6 to 10 show highly generalized schematic block circuit diagrams for explaining a plurality of different possible operating modes of the system according to the invention, with heat flow directions indicated.
Figure 8:
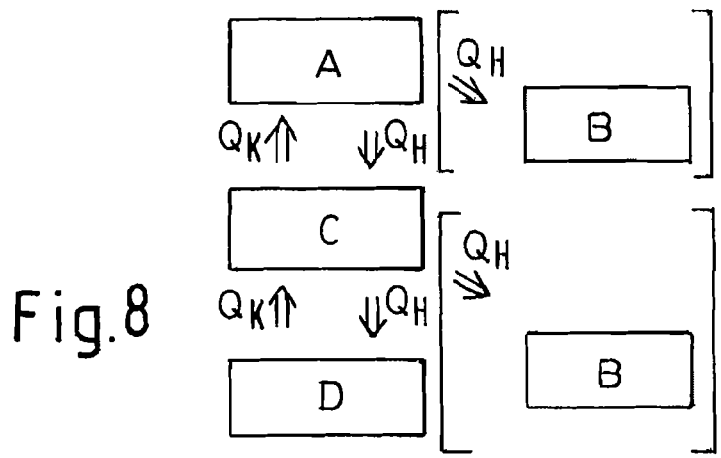
Figure 9:
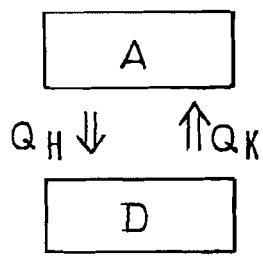
Figure 10:
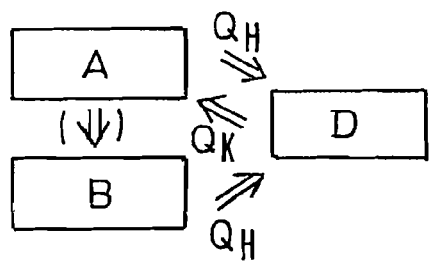

In detail:

FIG. 6 shows an indirect exchange of heat between the A/C circuit A and the catalytic converter D via the engine coolant circuit B, FIG. 7 shows a direct exchange of heat A-D and additionally A-B, FIG. 8 shows an indirect exchange of heat A-D via the intermediate circuit C, optionally with an exchange of heat A-B and/or C-B, FIG. 9 shows only the direct exchange of heat A-D and FIG. 10 shows a location-dependent exchange of heat between A and D and if appropriate between B and D from regions, which are situated nearby in the vehicle, within the circuits A/B to D, wherein a direct exchange of heat between A and B may also be provided.

Figure 11:
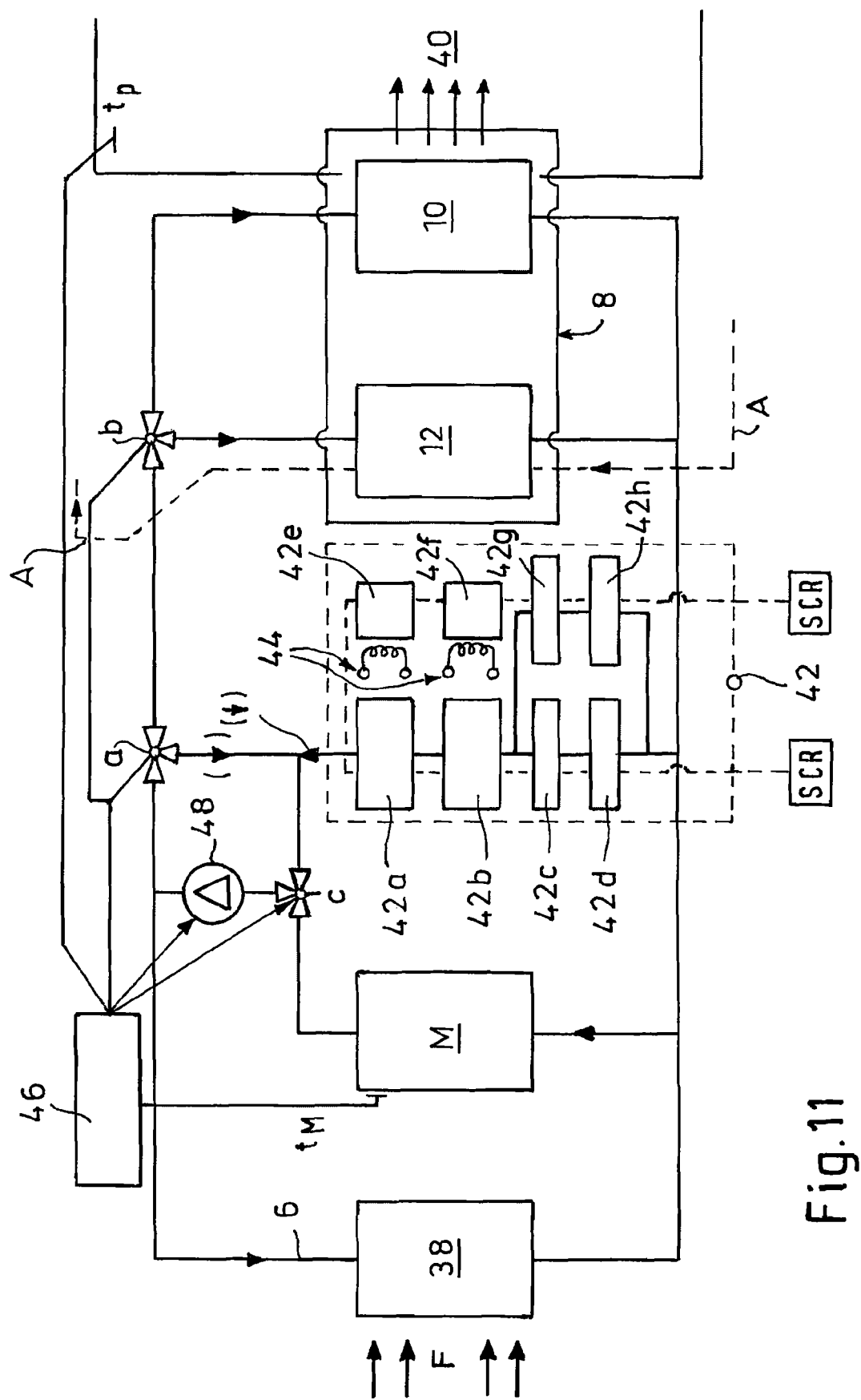
FIG. 11 shows a block circuit diagram of a "universal circuit" designed for different, selectable (settable) possible operating modes.

FIG. 11 illustrates an advantageous exemplary embodiment of a "universal circuit" of the system according to the invention. Said figure illustrates the engine M with its cooler 38 arranged in the vehicle front region F and the coolant circuit 6. The first heat exchanger 10 and the second heat exchanger 12 are arranged within the air-conducting part 8 (HVAC unit) already mentioned above, with the second heat exchanger 12 being situated in the refrigerant circuit A (illustrated merely by dashed lines) of the air conditioning system 1. The two heat exchangers 10 and 12 may also be connected into the engine coolant circuit 6, for which purpose switching valves (3-way valves) a, b, c are provided. Temperature-controlled (heated or cooled) air is conducted via the air-guiding part 8 into the vehicle interior space 40 in the direction of the plotted arrows.

Also illustrated in FIG. 11 is an additive heat exchanger arrangement 42 which may be composed of a plurality of heat exchangers 42a-42h which are connected in parallel and/or in series. Said "heat exchangers", which are illustrated in simplified form as blocks, symbolize any desired additive components within the supply system, such as for example a tank, lines, line connectors etc. The individual heat exchangers may if appropriate be arranged so as to be distributed locally at different points in the vehicle. In this example, the heat exchanger arrangement 42 may also be traversed by the engine coolant. This therefore involves an indirect exchange of heat via the coolant to the additive system. In addition or alternatively, it is possible for electrical heating means 44 to be provided, specifically in particular in regions of the additive system in which an additional supply of heat is desired and/or which can be reached by the coolant and/or refrigerant circuit only with difficulty ("hybrid heating").

In a further advantageous embodiment, it is possible to provided an (electronic) priority circuit 46 which, on the basis of certain measurement variables, for example the temperature $t_M$ of the engine M or of the coolant and/or the temperature $t_p$ in the vehicle interior space 40, activates the switching valves a, b, c and in particular also the air conditioning system and preferably a pump 48 in the coolant circuit 6 in such a way that, in the event of an engine cold start, the engine coolant is firstly heated in order to urgently and quickly heat up the additive system in the heating mode of the air conditioning system 1, preferably via the second heat exchanger 12. The coolant, which is for example heated in the heat exchanger 12, dissipates its heat to the additive system by means of the additive heat exchanger(s) 20 and/or 42 situated in the coolant circuit. Once the additive system has heated up to a sufficient temperature, for example once said additive system has thawed from a frozen state, it is possible by means of the priority circuit 46 to connect the engine M into the coolant circuit in order to also heat the vehicle interior space 40 by means of the first heat exchanger 10. It is therefore advantageously possible with the illustrated circuit, on account of the parallel connection of the engine M and heat exchanger arrangement 42, for the engine M to be completely separated from said heat exchanger arrangement 42 at times; a connection takes place automatically in a temperature-dependent fashion.

The "universal circuit" according to FIG. 11 permits numerous operating modes, specifically advantageously with only one pump 48. It is thus possible by means of the switching valves a, b, c for the engine M, with its cooling circuit, and the second heat exchanger 12 to be connected together. In this way, the engine coolant can be heated by means of the A/C circuit A. Furthermore, the coolant circuit of the engine M may of course be connected to the first heat exchanger 10 in order to heat the passenger compartment by means of the engine heat in the conventional way. It is also possible for the coolant circuit of the engine M to be conducted, in a likewise conventional way, via the vehicle cooler 38 in order to dissipate the engine heat to the ambient air flowing in the direction of the arrow. Connecting the engine M and the additive heat exchanger arrangement 42 together makes it possible for the engine heat to be dissipated to the additive system. Finally, it is possible for the heat exchanger arrangement 42 and the second heat exchanger 12 to be connected together optionally without a connection to the engine M or alternatively with a connection to the engine M in order to heat the additive system by means of the A/C system.

Figure 12:
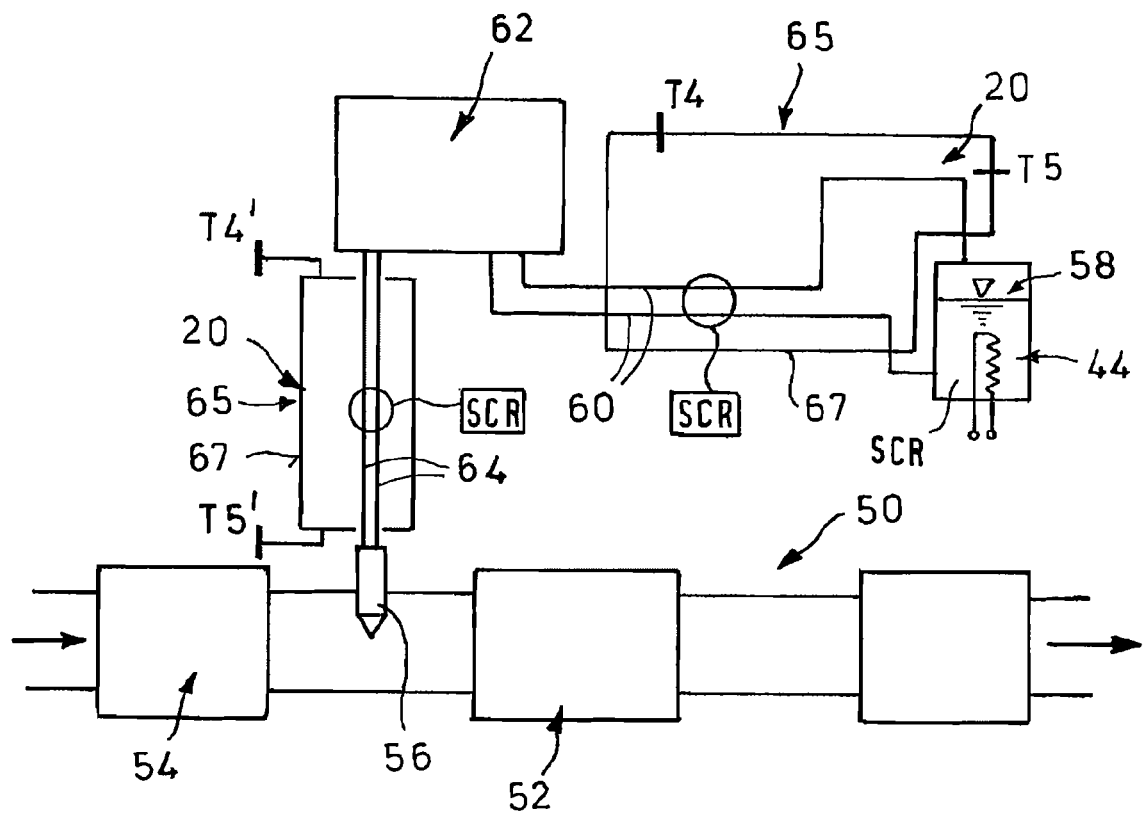
FIG. 12 shows a schematic circuit diagram of an SCR catalytic converter system with an exemplary reducing additive supply and FIG. 13 shows a section of an SCR line with a parallel heating line.

FIG. 12 shows, by way of example, an SCR catalytic converter system, with an SCR catalytic converter 52 being arranged in an exhaust section 50. It is optionally possible for an oxidation catalytic converter 54 to be arranged upstream of said SCR catalytic converter 52 in the exhaust-gas flow direction. The SCR reducing additive is supplied into the exhaust section 50 upstream of the SCR catalytic converter 52 in a dosed fashion by means of an injector 56. The reducing additive SCR is stored in a tank 58 and passes via lines 60 via a feed unit 62 and further lines 64 to the injector 56. Here, the region of the lines 60 and/or of the lines 64 may be designed as an additive heat exchanger 20, by virtue of the respective lines being heated at least in sections by the refrigerant circuit A or the intermediate circuit C, by virtue of the lines being assigned at least one through-flow element 65 which is situated in the circuit A or C. In the case of FIG. 12, the/each through-flow element 65 is designed as a tank-like or casing-like container 67 which surrounds the respective line(s) in sections. The heat exchangers 20 according to FIG. 12 are connected into the circuit according to FIG. 1 via the parting points T4, T5 or T4', T5'. It is possible here for the heat exchangers 20 to be connected in series or in parallel. It is of course also possible for electrical heating means 44 to be provided in particular in the region of the tank 58. This also applies correspondingly to the region of the lines 60, 64. In the example illustrated in FIG. 12, the additive lines are designed in each case as a feed and return line, though it would also be possible for in each case only one line to be provided.

Figure 13:
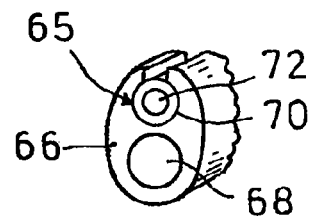

Finally, as regards FIG. 13, it is possible for a "heat exchanger" or an exchange of heat to be realized by means of a type of double line 66, with a duct 68 for the additive being provided and with a line 70 being guided parallel to said duct 68 as a through-flow element, through the duct 72 of which line 70 the respective heat medium can be conducted. The line 70 may be placed as a separate part, composed in particular of heat-conducting material (metal), into an axial, open-edged receptacle of the double line 66.

Furthermore, there is of course a multiplicity of other possibilities for providing the exchange of heat according to the invention.

The invention is not restricted to the exemplary embodiments which are illustrated and described, but rather also encompasses all equivalent designs within the context of the invention. Furthermore, the invention is not restricted to the combination of features defined in the respective independent claim, but rather may also be defined by any other desired combination of certain features of all of the individual features disclosed. This means that basically practically any individual feature of the respective independent claim may be omitted or replaced with at least one individual feature disclosed at some other point in the application. In this respect, the claims are to be understood merely as a first attempt at formulating an invention.

The invention claimed is:

1. A system for controlling the temperature of a fluid additive for an exhaust system of an internal combustion engine in a motor vehicle, comprising
a refrigerant circuit of a refrigerant system circulating a refrigerant therein and a heat exchanger configured for exchanging heat between the additive and the refrigerant circulating in the refrigerant circuit of the refrigerant system, the heat exchanger being configured for indirectly exchanging heat from the refrigerant via an intermediate circuit having an intermediate heat carrier medium, wherein the intermediate circuit is a constituent part of an engine coolant circuit having coolant circulating therein, and wherein the heat exchanger for the indirect exchange of heat via the intermediate circuit comprises a first and second partial heat exchanger with the first partial heat exchanger being located between the refrigerant circuit and the intermediate circuit and the second partial heat exchanger being located between the intermediate circuit and the additive, and wherein the refrigerant circuit is configured for operating in a heating mode comprising a compressor, the first partial heat exchanger, an expansion valve, an evaporator and a condenser.

2. The system according to claim 1, wherein an accumulator and/or an auxiliary heat exchanger are/is arranged between the evaporator and the condenser.

3. The system according to claim 1, wherein the heat exchanger is embodied as a through-flow exchanger having a second through-flow passage for the additive and a first through-flow passage for the refrigerant or for the intermediate heat carrier medium of the intermediate circuit for exchanging heat between the additive and the refrigerant.

4. The system according to claim 1, wherein the heat exchanger comprises a tank exchanger having a tank for the additive and having a through-flow passage for the refrigerant or for the intermediate heat carrier medium of the intermediate circuit for exchanging heat between the additive and the refrigerant.

5. The system according to claim 1, characterized in that at least two heat exchangers are connected in series or parallel with respect to a through-flow of coolant of a coolant circuit or the intermediate heat carrier medium of the intermediate circuit for exchanging heat between the additive and the refrigerant.

6. The system according to claim 1, wherein the compressor is fitted with an electromotive drive.

7. The system according to claim 1, wherein the refrigerant system operates with single-stage or multi-stage expansion.

8. The system according to claim 1, wherein the refrigerant system is a motor vehicle air conditioning system.

9. The system according to claim 1, wherein the fluid additive is a $NO_x$-reducing additive for an SCR catalytic converter system of a motor vehicle.

10. The system according to claim 9, wherein the fluid additive is a urea-water solution.

11. The system according to claim 1, wherein the refrigerant circuit can be operated selectively in a cooling mode or in the heating mode.

12. The system according to claim 11, wherein the refrigerant circuit for the cooling mode comprises a compressor, a condenser, an expansion valve and an evaporator, with the heat exchanger for cooling the additive being provided between the expansion valve and the evaporator.

13. The system according to claim 1, wherein the heat exchanger is formed from at least one line for the additive and a through-flow element, which is associated with the line, for the refrigerant or for the intermediate heat carrier medium of the intermediate circuit for exchanging heat between the additive and the refrigerant.

14. The system according to claim 13, wherein the through-flow element is an encapsulation which surrounds the line at least in sections.

15. The system according to claim 13, wherein the through-flow element is composed of at least one duct which runs adjacent to the line at least in sections for exchanging heat.

* * * * *